Patented Apr. 23, 1946

2,398,976

UNITED STATES PATENT OFFICE 2,398,976

RUBBERLIKE POLYMERIZATION PRODUCT AND PROCESS FOR PRODUCING SAME

Charles A. Thomas, Dayton, Ohio, assignor to Monsanto Chemical Company, St. Louis, Mo., a corporation of Delaware No Drawing. Application April 18, 1940, Serial No. 330,374

11 Claims. (Cl. 260—86.5)

This invention relates to the manufacture of polymerization products from unsaturated organic materials. More particularly, the present invention relates to a process of preparing artificial rubber-like masses and to the new rubber-like masses obtainable by said process.

It is known to manufacture artificial rubber-like masses by causing interpenetration of the polymerization product of a butadiene hydrocarbon with a polymerization product of an olefine benzene, such as styrene or alpha-alkyl-styrene. Such processes and the resulting compositions are shown in United States Patents 1,938,730 and 1,938,731, granted to Edward Tschunkur et al., December 12, 1933. By the present invention, it has been found that superior rubber-like products can be produced by causing interpenetration of polymerization products of diolefine hydrocarbons, olefine hydrocarbons and olefine benzenes, such as styrene, alpha-alkyl-styrene, polyvinyl benzenes, and the like. Such products are generally softer and more easily worked on rubber mixing rolls than those heretofore obtained by the interpolymerization of a butadiene hydrocarbon and an olefine benzene in the absence of an olefine. All three types of compounds are necessary and the physical properties of the resulting product are related to the ratios of the three constituents in the polymerizates.

Diolefines, such as butadiene, and olefines, such as butylene, occur in petroleum distillates resulting from high temperature pyrolysis. For example, it is possible to produce a four carbon hydrocarbon fraction by the pyrolysis of Pennsylvania gas oil (Beacon range oil #1) at 1400° F. with a contact time of 28 seconds and in the presence of 5 per cent of steam. Under these conditions, a weight yield of four carbon hydrocarbons from the charge stock of 10.1% is obtained. The four carbon hydrocarbons consist of 38% butadiene, 38% butylene and 24% unreacted butane. After removal of the butane, such a fraction can be mixed with an olefine benzene, such as styrene, and polymerized under the conditions described below to produce a rubber-like polymerizate. However, butadiene may be produced by one of several methods, such as effecting an aldol condensation of acetaldehyde, hydrogenating the product to a glycol and finally dehydrating the glycol to 1,3-butadiene. This diolefine can then be mixed with an olefine, such as amylene, and an olefine benzene, such as styrene.

Furthermore, diolefines can be produced by dehydrogenation from the corresponding olefine, for example, butadiene can be produced by the dehydrogenation of normal butylene. In such cases, it is unnecessary to separate the diolefine from the unreacted olefine and the mixture of butadiene and butylene can be employed directly in conjunction with an olefine benzene in accordance with this invention.

Any polymerizable olefine, di-olefine or olefine benzene may replace the specific materials hereinbefore described and the present invention is not limited to these materials. However, the preferred components employed in the preparation of these new polymerizates are: a di-olefine possessing the general formula,

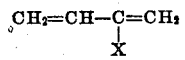

wherein X means hydrogen or an alkyl group; an olefine such as amylene, butylene and the like possessing the formula $C_nH_{2n}$, wherein $n$ is an integer; and an olefine benzene such as styrene or alpha-alkyl-styrene.

According to the process of this invention, the three components, i. e. the olefine, di-olefine and olefine benzene are mixed and preferably emulsified in water by means of a suitable emulsifying agent. The commercial emulsifying agent "Sapamine" (a higher fatty acid N-carboxyl ester of symmetrically substituted ethylene diamines, as for example, diethyl aminoethyloleamide) has been found to be a desirable emulsifying agent for carrying out this reaction, although others may be used. The emulsion is then heated in the presence of a suitable polymerization catalyst under regulated conditions, and, preferably, agitated. Generally, the reaction is carried out in a closed system capable of withstanding considerable pressure.

The product so obtained can be compounded with the well-known fillers, such as carbon black, zinc oxide and the like, vulcanization agents such as sulfur, and vulcanization accelerators, and vulcanized to produce highly valuable products.

The following is given as a specific example illustrating one embodiment of this invention, but is to be understood as not limitative of the scope thereof. The parts are by weight in this example. Into a suitable stainless steel vessel capable of withstanding relatively high pressures, there were charged

|  | Parts |
|---|---|
| Water | 127.1 |
| Sapamine | 1.3 |
| Monomeric styrene | 27.0 |
| Benzoyl peroxide | 1.0 |

The mixture was emulsified and then cooled by means of a mixture of dry ice (solid carbon dioxide) and acetone. 90.5 parts of a mixture comprising substantially 29.6% by weight of butadiene and 70.4% by weight of butylene were liquified by means of dry ice and added to the contents of the pressure vessel. The mixture was then emulsified and allowed to polymerize, while suitably agitated, for a period of ten days at a temperature of substantially 60–65° C. After this period of polymerization, the residual gas was withdrawn and found to amount to 68 parts of which 8.4 parts (12.4% by weight) was butadiene, and the balance, 59.6 parts (87.6% by weight), butylene. It is thus apparent that 68.7% of the butadiene and 6.4% of the butylene has entered into the polymerization product. The liquid product of the reaction comprised a milky aqueous liquid. A soft rubbery polymer was precipitated from the milky aqueous liquid by the addition of concentrated acetic acid. The polymer so obtained was easily workable on the rubber mixing rolls and on compounding with well-known fillers and vulcanizing agents gave desirable rubber-like products.

While in the above example specific reaction conditions are given, the present invention is not limited to such conditions. Thus, while benzoyl peroxide has been employed as the polymerization catalyst, it will be understood that other polymerization catalysts, and preferably oxygen furnishing catalysts, may be used to good advantage. Further, the temperature of the polymerization may be varied, but it is preferred to employ a temperature below the boiling point of water. Also, for example, variations may be introduced as to the particular diolefine, olefine and olefine benzene conjointly polymerized; the relative proportions of said unsaturated materials; dilution of the reaction mix; etc., without departing from the essence of the invention. Of course, as is evident to one skilled in the art, variations relating to the reactants per se will be accompanied by a certain degree of alteration of the physical properties of the final product. Thus, it may be desirable to relate the concentration of the individual components and their period of polymerization to the rates of polymerization of the individual substances as a means of controlling the composition of the final product. Furthermore, since the olefine benzenes and the di-olefines polymerize or interpenetrate more readily than do the olefines, the ultimate composition of the products lends itself to control by this means. Generally, however, it is desirable to carry out this reaction slowly so that substantial amounts of the olefines enter into the final polymerization products.

It is thus shown, according to this invention, that contrary to prior processes it is not necessary to remove olefines, such as butylene and the like, by costly and exacting processes from butadienes prior to polymerization in admixture with olefine benzenes. These olefines may not only be allowed to remain but enter into the polymerization process to produce an improved product.

It is not possible at this time to state the mechanism of the reaction involved in the operation of this invention, nor is the invention limited by any theories as to the process of the reaction.

This invention is limited solely by the claims appended hereto as a part of this specification.

What is claimed is:

1. A process for the preparation of a rubbery polymerizate which comprises forming an aqueous emulsion of an olefine benzene, a diolefine of the formula:

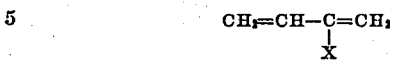

where X is a member of the group consisting of hydrogen and an alkyl radical, and an aliphatic olefine selected from the group consisting of a butylene and an amylene, and polymerizing said emulsion of hydrocarbons in the presence of an oxygen yielding peroxide catalyst to form a polymerizate comprising a relatively small proportion of polymerized aliphatic olefine and a relatively large proportion of polymerized diolefine and polymerized olefine benzene, and precipitating the polymerizate so formed.

2. A process for the preparation of a rubbery polymerizate which comprises forming an aqueous emulsion of styrene, a diolefine of the formula:

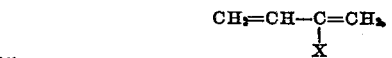

where X is a member of the group consisting of hydrogen and an alkyl radical, and an aliphatic olefine selected from the group consisting of a butylene and an amylene, and polymerizing said emulsion of hydrocarbons in the presence of an oxygen yielding peroxide catalyst to form a rubbery polymerizate comprising a relatively small proportion of polymerized aliphatic olefine and a relatively large proportion of polymerized styrene and polymerized diolefine, and precipitating the polymerizate so formed.

3. A process for the preparation of a rubbery polymerizate which comprises forming an aqueous emulsion of a polyvinyl benzene, a diolefine of the formula:

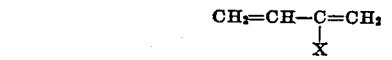

where X is a member of the group consisting of hydrogen and an alkyl radical, and an aliphatic olefine selected from the group consisting of a butylene and an amylene, and polymerizing said emulsion of hydrocarbons in the presence of an oxygen yielding peroxide catalyst to form a polymerizate comprising a relatively small proportion of polymerized aliphatic olefine and a relatively large proportion of a polymerized polyvinyl benzene and polymerized diolefine, and then precipitating the polymerizate so formed.

4. A process for the preparation of a rubbery polymerizate which comprises forming an aqueous emulsion of an alpha-alkyl styrene, a diolefine of the formula:

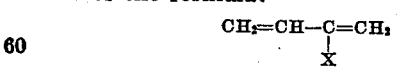

where X is a member of the group consisting of hydrogen and an alkyl radical, and an aliphatic olefine selected from the group consisting of a butylene and an amylene, and polymerizing said emulsion of hydrocarbons in the presence of an oxygen yielding peroxide catalyst to form a polymerizate comprising a relatively small proportion of polymerized aliphatic olefine and a relatively large proportion of polymerized styrene and polymerized diolefine, and then precipitating the polymerizate so formed.

5. A process for the preparation of a rubbery polymerizate which comprises forming an aqueous emulsion of styrene, butadiene and an aliphatic olefine selected from the group consisting of a butylene and an amylene and polymerizing said emulsion of hydrocarbons in the presence of an oxygen yielding peroxide catalyst to form a polymerizate comprising a relatively small proportion of polymerized olefine and a relatively large proportion of polymerized styrene and polymerized butadiene, and then precipitating the polymerizate so formed.

6. Rubbery polymerization products obtained by polymerizing in the presence of an oxygen yielding peroxide catalyst an aqueous emulsion of an olefine benzene, a diolefine of the formula:

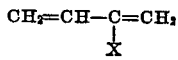

where X is a member of the group consisting of hydrogen and an alkyl radical, and an aliphatic olefine selected from the group consisting of a butylene and an amylene, said polymerization products comprising a relatively small proportion of polymerized aliphatic olefine and a relatively large proportion of a polymerized diolefine and polymerized olefine benzene.

7. Rubbery polymerization products obtained by polymerizing in the presence of an oxygen yielding peroxide catalyst an aqueous emulsion of monomeric styrene, butadiene and an olefine selected from the group consisting of a butylene and an amylene, said polymerization products comprising a relatively small proportion of polymerized olefine and a relatively large proportion of polymerized styrene and polymerized butadiene.

8. A process for the preparation of a rubbery polymerizate which comprises forming an aqueous emulsion of styrene, butadiene-1,3, and a butylene, and polymerizing said emulsion of hydrocarbons in the presence of an oxygen-yielding peroxide catalyst to form a polymerizate comprising a relatively small proportion of the polymerized butylene and a relatively large proportion of polymerized styrene and polymerized butadiene-1,3, and then precipitating the polymerizate so formed.

9. A rubbery polymerization product obtained by polymerizing, in the presence of an oxygen-yielding peroxide catalyst, an aqueous emulsion of monomeric styrene, butadiene-1,3 and a butylene, said polymerization product comprising a relatively small proportion of the polymerized butylene and a relatively large proportion of polymerized styrene and polymerized butadiene-1,3.

10. A process for the preparation of a rubbery polymerizate which comprises forming an aqueous emulsion of styrene, butadiene-1,3, and an amylene, and polymerizing said emulsion of hydrocarbons in the presence of an oxygen-yielding peroxide catalyst to form a polymerizate comprising a relatively small proportion of the polymerized amylene and a relatively large proportion of polymerized styrene and polymerized butadiene-1,3, and then precipitating the polymerizate so formed.

11. A rubbery polymerization product obtained by polymerizing, in the presence of an oxygen-yielding peroxide catalyst, an aqueous emulsion of monomeric styrene, butadiene-1,3, and an amylene, said polymerization product comprising a relatively small proportion of the polymerized amylene and a relatively large proportion of polymerized styrene and polymerized butadiene-1,3.

CHARLES A. THOMAS.